United States Patent
Zhang et al.

(10) Patent No.: US 10,638,334 B2
(45) Date of Patent: Apr. 28, 2020

(54) BEAM SELECTION METHOD AND APPARATUS AND COMMUNICATION SYSTEM

(71) Applicant: FUJITSU CONNECTED TECHNOLOGIES LIMITED, Kawasaki-shi, Kanagawa (JP)

(72) Inventors: Yi Zhang, Beijing (CN); Hua Zhou, Beijing (CN); Lei Song, Beijing (CN)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 0 days.

(21) Appl. No.: 15/218,802

(22) Filed: Jul. 25, 2016

(65) Prior Publication Data
US 2016/0337881 A1 Nov. 17, 2016

Related U.S. Application Data

(63) Continuation of application No. PCT/CN2014/071673, filed on Jan. 28, 2014.

(51) Int. Cl.
*H04W 24/02* (2009.01)
*H04B 7/06* (2006.01)
(Continued)

(52) U.S. Cl.
CPC .......... *H04W 24/02* (2013.01); *H04B 7/0452* (2013.01); *H04B 7/0456* (2013.01);
(Continued)

(58) Field of Classification Search
CPC ...... H04B 7/06; H04B 7/0617; H04B 7/0626; H04B 7/0632; H04B 7/0639;
(Continued)

(56) References Cited

U.S. PATENT DOCUMENTS 8,620,221 B2 12/2013 Kishigami et al.
9,520,973 B2 12/2016 Kim et al.
(Continued)

FOREIGN PATENT DOCUMENTS

CN 102938688 A 2/2013
CN 103220026 A 7/2013
(Continued)

OTHER PUBLICATIONS

Notification of Reasons for Refusal issued for corresponding Japanese Patent Application No. 2016-548273 dated Jun. 20, 2017, with an English translation.

(Continued)

*Primary Examiner* — Ricky Q Ngo
*Assistant Examiner* — Kabir U Jahangir
(74) *Attorney, Agent, or Firm* — Myers Wolin, LLC

(57) ABSTRACT

Embodiments of the present disclosure provide a beam selection method and apparatus and a communication system. The method includes: a base station configures user equipment (UE) with measure resources, each measure resource corresponding to one beam: and selects a beam used for performing 3-dimensional multiple input multiple output (3D MIMO) transmission according to a measurement result reported by the UE. With the method of the embodiments of the present disclosure, measurement of the UE end is used to optimize beam selection, thereby improving accuracy of beam-forming at the base station end.

14 Claims, 4 Drawing Sheets

201 a base station configures user equipment (UE) with measure resources, each measure resource corresponding to one beam

202 the base station selects a beam used for performing 3-dimensional multiple input multiple output (3D MIMO) transmission according to a measurement result reported by the UE

(51) Int. Cl.
| | |
|---|---|
| *H04B 7/0456* | (2017.01) |
| *H04B 7/0452* | (2017.01) |
| *H04L 5/00* | (2006.01) |
| *H04W 72/12* | (2009.01) |
| *H04W 88/02* | (2009.01) |
| *H04W 88/08* | (2009.01) |

(52) U.S. Cl.
CPC ......... *H04B 7/0617* (2013.01); *H04B 7/0626* (2013.01); *H04B 7/0632* (2013.01); *H04B 7/0639* (2013.01); *H04B 7/0695* (2013.01); *H04L 5/005* (2013.01); *H04W 72/1226* (2013.01); *H04W 88/02* (2013.01); *H04W 88/08* (2013.01)

(58) Field of Classification Search
CPC .. H04B 7/0695; H04B 7/0452; H04B 7/0456; H04W 24/02; H04W 72/1226; H04W 88/08; H04W 88/02; H04L 5/005
See application file for complete search history.

(56) References Cited

U.S. PATENT DOCUMENTS

| | | | |
|---|---|---|---|
| 2013/0163544 A1 | 6/2013 | Lee et al. | |
| 2013/0194950 A1* | 8/2013 | Haghighat | H04W 24/02 370/252 |
| 2013/0242773 A1 | 9/2013 | Wernersson et al. | |
| 2014/0003240 A1* | 1/2014 | Chen | H04W 28/08 370/235 |
| 2014/0192762 A1 | 7/2014 | Li et al. | |
| 2014/0211731 A1 | 7/2014 | Inoue et al. | |
| 2015/0071194 A1* | 3/2015 | Kim | H04L 5/0048 370/329 |
| 2015/0382205 A1* | 12/2015 | Lee | H04B 7/0417 370/329 |
| 2016/0337056 A1* | 11/2016 | Frenne | H04B 7/0695 |
| 2017/0005710 A1* | 1/2017 | Kim | H04B 7/0417 |

FOREIGN PATENT DOCUMENTS

| | | |
|---|---|---|
| WO | 2009/098880 A1 | 8/2009 |
| WO | 2011/103919 A1 | 9/2011 |
| WO | 2013/024350 A2 | 2/2013 |
| WO | 2013/024852 A1 | 2/2013 |
| WO | 2014/010994 A1 | 1/2014 |

OTHER PUBLICATIONS

International Search Report issued for corresponding International Patent Application No. PCT/CN2014/071673, dated Oct. 27, 2014, with an English translation.
Written Opinion of the International Searching Authority issued for corresponding International Patent Application No. PCT/CN2014/071673, dated Oct. 27, 2014, with an English translation.
Extended European search report with supplementary European search report and the European search opinion issued by the European Patent Office for corresponding European Patent Application No. 14881306.6, dated Aug. 7, 2017.
Notice of Final Rejection issued by the Korean Intellectual Property Office for corresponding Korean Patent Application No. 10-2016-7021172, dated Apr. 27, 2018, with an English translation.
Notice of Preliminary Rejection issued by the Korean Intellectual Property Office for corresponding Korean Patent Application No. 10-2016-7021172, dated Feb. 12, 2018, with an English translation.
ZTE, "Viewpoint for CSI-RS sequence for different antenna ports", 3GPP TSG RAN WG1 Meeting #63bis, Document for Discussion and Decision, Agenda item 6.2.2.1, R1-110170, Jan. 17-21, 2011, Dublin, Ireland.
First Notification of Office Action issued by the State Intellectual Property Office of China for corresponding Chinese Patent Application No. 201480071475.8, dated Sep. 29, 2018, with an English translation.
Decision of Rejection issued by the China National Intellectual Property Administration for corresponding Chinese Patent Application No. 201480071475.8, dated Dec. 3, 2019, with an English translation.
Intellectual Property Trial and Appeal Board Division 8 Decision for Case No. 2018 Won 3176 issued by the Korean Intellectual Property Office for corresponding Korean Patent Application No. 10-2016-7021172, dated Dec. 16, 2019, with an English translation.

* cited by examiner

--Related Art--

US 10,638,334 B2

BEAM SELECTION METHOD AND APPARATUS AND COMMUNICATION SYSTEM

CROSS REFERENCE TO RELATED APPLICATIONS

This application is a continuation application of International Application PCT/CN2014/071673 filed on Jan. 28, 2014, the entire contents of which are incorporated herein by reference.

FIELD

The present disclosure relates to the field of communications, and in particular to a beam selection method and apparatus and a communication system.

BACKGROUND

With the development of antenna technologies, a large amount of antennas may be placed at a transmitting side. Efficiency and reliability of system transmission may be improved by joint transmission of multiple antennas. 3-dimensional (3D) beam-forming in a multiple input multiple output (MIMO) system is one of such technologies, which increases antenna gain, decreases inter-antenna co-channel interference, and is a hot candidate technology of a long-term evolution (LTE) system Release 13.

FIG. 1 is a schematic diagram of a network architecture of the 3-dimensional beam-forming technology. As shown in FIG. 1, in order to support a relatively good beam-forming technology, a base station end needs to acquire beam direction information of a user equipment (UE) end. A conventional method relies on an implementation technology of the base station end. For example, by using reciprocity of uplink and downlink channels, a direction of downlink beam-forming is estimated via the uplink channels. In a 3D MIMO system, each antenna port may include multiple antenna elements, and a width of a beam becomes narrow obviously. Thus, antenna gain becomes larger, inter-beam interference becomes more complex, and influence of beam selection and coordination on the performance of the system becomes larger.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Embodiments of the present disclosure provide a beam selection method and apparatus and a communication system, in which measurement of a UE end is used to optimize beam selection, thereby improving accuracy of beam-forming at the base station end.

According to a first aspect of the embodiments of the present disclosure, there is provided a beam selection method, including:

a base station configures user equipment (UE) with measure resources, each measure resource corresponding to one beam; and the base station selects a beam used for performing 3-dimensional multiple input multiple output (3D MIMO) transmission according to a measurement result reported by the UE.

According to a second aspect of the embodiments of the present disclosure, there is provided a beam selection method, including:

a user equipment performs measurement on measure resources configured by a base station for it, each measure resource corresponding to one beam; and the user equipment reports a measurement result of the measure resources.

According to a third aspect of the embodiments of the present disclosure, there is provided a beam selection apparatus, including:

a configuring unit configured to configure user equipment (UE) with measure resources, each measure resource corresponding to one beam; and a selecting unit configured to select a beam used for performing 3-dimensional multiple input multiple output (3D MIMO) transmission according to a measurement result reported by the UE.

According to a fourth aspect of the embodiments of the present disclosure, there is provided a base station, including the beam selection apparatus as described in the third aspect.

According to a fifth aspect of the embodiments of the present disclosure, there is provided a beam selection apparatus, including:

a measuring unit configured to perform measurement on measure resources configured by a base station, each measure resource corresponding to one beam; and a reporting unit configured to report a measurement result of the measure resources.

According to a sixth aspect of the embodiments of the present disclosure, there is provided a user equipment, including the beam selection apparatus as described in the fifth aspect.

According to a seventh aspect of the embodiments of the present disclosure, there is provided a communication system, including a base station and a user equipment, wherein, the base station is configured to configure the user equipment (UE) with measure resources, and select a beam used for performing 3-dimensional multiple input multiple output (3D MIMO) transmission according to a measurement result reported by the UE;

and the UE is configured to perform measurement on measure resources configured by the base station for it, and report a measurement result of the measure resources;

wherein, each measure resource corresponds to one beam.

According to another aspect of the embodiments of the present disclosure, there is provided a computer-readable program, wherein when the program is executed in a base station, the program enables the base station to carry out the beam selection method as described in the first aspect.

According to a further aspect of the embodiments of the present disclosure, there is provided a storage medium in which a computer-readable program is stored, wherein the computer-readable program enables a base station to carry out the beam selection method as described in the first aspect.

According to still another aspect of the embodiments of the present disclosure, there is provided a computer-readable program, wherein when the program is executed in UE, the program enables the UE to carry out the beam selection method as described in the second aspect.

According to yet another aspect of the embodiments of the present disclosure, there is provided a storage medium in which a computer-readable program is stored, wherein the computer-readable program enables UE to carry out the beam selection method as described in the second aspect.

An advantage of the embodiments of the present disclosure exists in that with the method of the embodiments of the present disclosure, measurement of the UE end is used to optimize beam selection, thereby improving accuracy of beam-forming at the base station end, and optimizing the performance of the system.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the exemplary embodiments of the present disclosure, and are used for setting forth the principles of the present disclosure together with the description. It is clear and understood that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims. Various embodiments of the present disclosure shall be described below with reference to the accompanying drawings. These embodiments are illustrative only, and are not intended to limit the present disclosure.

At a UE end of a 3-dimensional beam-forming system, a conventional measurement result based on cell-specific reference signals (CRSs) cannot reflect a specific beam-formed gain of each user equipment (UE), and embodiments of the present disclosure propose to use a measurement result based on enhanced reference signals to aid beam selection. Furthermore, on a basis of the beam selection, a base station configures a channel state information (CSI) process, and the UE periodically and aperiodically reports CSI according to the configured CSI process, thereby improving accuracy of beam-forming at the base station end.

The method, apparatus and system of the embodiments of the present disclosure shall be described below with reference to the embodiments and accompanying drawings.

Embodiment 1

Figure 1:
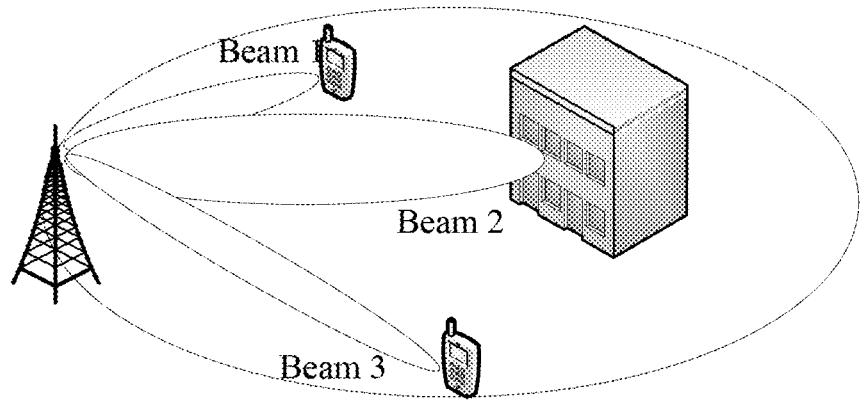
FIG. 1 is a schematic diagram of a network architecture of the 3-dimensional beam-forming technology.
Figure 2:
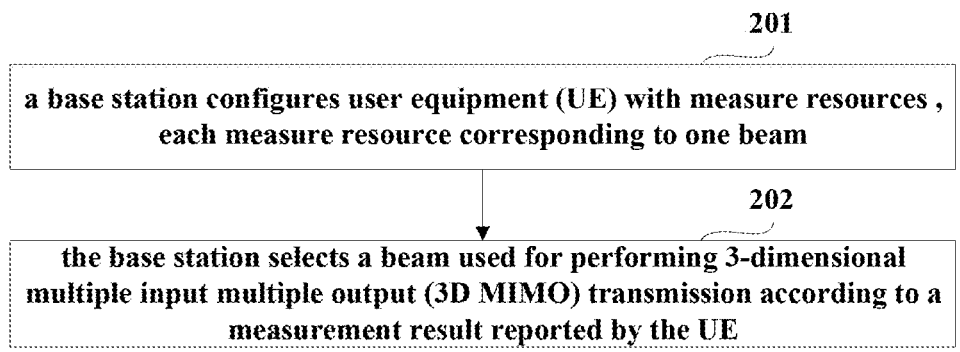
FIG. 2 is a flowchart of an implementation of the beam selection method of an embodiment of the present disclosure.

An embodiment of the present disclosure provides a beam selection method. FIG. 2 is a flowchart of the method. Referring to FIG. 2, the method includes:

step 201: a base station configures user equipment (UE) with measure resources, each measure resource corresponding to one beam; and step 202: the base station selects a beam used for performing 3-dimensional multiple input multiple output (3D MIMO) transmission according to a measurement result reported by the UE.

In this embodiment, the base station configures the UE with the measure resources corresponding to the beams, the UE performs measurement on the measure resources based on the configuration of the base station, and reports a measurement result, and the base station determines based on the measurement result to select which beams as beams for the 3D MIMO transmission, thereby improving accuracy of beam-forming at the base station end.

In this embodiment, the base station may configure the UE with the measure resources via high-layer signaling, and may also configure the UE with the measure resources in a predefining manner, and this embodiment is not limited thereto. For example, the base station may configure the UE with the measure resources by transmitting the above high-layer signaling to the UE, that is, the base station transmits configuration information to the UE, the configuration information indicating the above measure resources and being carried by the above high-layer signaling; and the base station may also configure the UE with the measure resources in other configuration manners.

In an implementation of this embodiment, the base station may directly determine according to the measurement result reported by the UE to select which beams as beams for the 3D MIMO transmission. In another implementation of this embodiment, the base station configures the CSI process according to the measurement result reported by the UE, the UE periodically and aperiodically reports CSI corresponding to the CSI process configured by the base station, and the base station selects the beams for the 3D MIMO transmission accordingly, thereby improving accuracy of beamforming at the base station end.

In an implementation of this embodiment, the measure resources are enhanced reference signals. The enhanced reference signals here may be CSI-RSs, and may also be other enhanced reference signals, such as reduced CRSs, etc. In this implementation, the reduced CRSs are relative to CRSs in existing specifications, such as CRS with port 0 and 5 ms period.

In this implementation, if the measure resources are CSI-RSs, the configuration information of the measure resources may include: the number of antenna ports, information on resource location in one resource block, and information on subframe configuration.

In the configuration information, the number of antenna ports indicates how many and/or which CSI-RSs of the antennas needed to be measured. As the density of the CSI-RSs is lower than that of the CRSs, in this embodiment, the number of ports of the CSI-RSs may be flexibly configured, so as to ensure reliability of the measurement result of the CSI-RSs. For example, multiple (such as 4 or 8) antenna ports may be configured, so as to indicate the UE to perform measurement of the CSI-RSs at the configured multiple antenna ports.

In the configuration information, the information on resource location in one resource block indicates locations of the measure resources. In this embodiment, the CSI-RS resources to which different beams correspond may be differentiated in a manner of code division, frequency division, or time division. As the spatial resolution of beams in a 3D MIMO system will be increased, spatial orthogonality of the beams may be possibly different.

For beams of relatively good spatial orthogonality, the CSI-RS resources to which the beams correspond may be differentiated in a manner of code division multiplexing, that is, different pseudo code sequences are used to differentiate different beams. For example, initial values of the pseudo code sequences (reference signal sequences) include indices to which the beams correspond, i.e. beam numbers. In particular, the reference signal sequence is:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1;$$

where, $n_s$ is a time slot number in a radio frame, and l is a number of an OFDM symbol in a time slot; the initial values of the pseudo code sequences c(i) are:

$$c_{init} = 2^{10} \cdot (7 \cdot (n_s+1) + l + 1) \cdot (2 \cdot N_{ID}^{cell} + 1) + 2 \cdot N_{ID}^{cell} + N_{CP} + N_{beam};$$

where, $N_{beam}$ is a beam number, which corresponds to a beam; and for a normal CP, $N_{CP}$ is 1, and for an extended CP, $N_{CP}$ is 0.

For beams of relatively bad spatial orthogonality, the CSI-RS resources to which the beams correspond may be differentiated in a manner of frequency division or time division. In this embodiment, part of the bandwidths of the CSI-RS resources may correspond to one beam. For example, all PRBs of the system are divided into N portions, each portion of resources being a measure resource corresponding to one beam.

In the configuration information, the subframe configuration information indicates how many and/or which CSI-RSs of the antennas needed to be measured. Taking the low density of the CSI-RSs and a requirement on measurement reliability into account, in this embodiment, a measurement bandwidth of each beam and a transmission period of the CSI-RSs may be flexibly configured, such as ensuring that a time-frequency density of the CSI-RSs at least reaches a predetermined value, such as 50 RE/5 ms. In this embodiment, for a system of a low system bandwidth, a method, in which a relatively large amount of antenna ports are configured or a transmission period of the CSI-RSs is reduced, may be adopted to configure the measure resources for the beams, so as to ensure reliability of the measurement result.

In this implementation, besides the number of antenna ports, the information on resource location in one resource block, and the information on subframe configuration, the configuration information of each measure resource may further include frequency resource information and/or power-related information, so as to ensure reliability of the measurement result at the LIE end. In this implementation, the frequency resource information may indicate frequencies on which measurement of the CSI-RSs needs to be performed, and the power-related information may indicate transmission power of the CSI-RSs; however, this embodiment is not limited thereto.

In this implementation, the configuration information of the CSI-RSs may include but not be limited to the following contents; and as described above, the configuration information may also include other contents or may omit a part of the following contents.

```
CSI-RS-Config-r10 ::=        SEQUENCE {
    csi-RS-r10                   CHOICE {
        release                      NULL,
        setup                        SEQUENCE {
            antennaPortsCount-r10        ENUMERATED {an1, an2, an4, an8},
            resourceConfig-r10           INTEGER (0..31),
            subframeConfig-r10           INTEGER (0..154),
            p-C-r10                      INTEGER (-8..15)
        }
    }                                                OPTIONAL,   -- Need
ON
    zeroTxPowerCSI-RS-r10        CHOICE {
        release                      NULL,
        setup                        SEQUENCE {
            zeroTxPowerResourceConfigList-r10    BIT STRING (SIZE (16)),
            zeroTxPowerSubframeConfig-r10        INTEGER (0..154)
        }
    }                                                OPTIONAL    -- Need
ON
}
```

In this implementation, if the measure resources are reduced CRSs, the configuration information of the measure resources may include any combination of the above configuration information, and this embodiment is not limited thereto.

In another implementation of this embodiment, the measure resources are antenna ports. That is, in this implementation, the measure resources are configured for the UE in a manner of using different ports to correspond to different beams. In this implementation, similar to above-described implementation, for beams of relatively good orthogonality, the CSI-RS resources to which some beams correspond, such as port 0 and port 1, may be differentiated in a manner of code division multiplexing (CDM); for beams of relatively bad orthogonality; the CSI-RS resources to which some beams correspond, such as port 0 and port 3, may be differentiated in a manner of frequency division multiplexing (FDM). It should be noted here that for reference signal measure resources of fixed cells and beams, neighboring beams should not correspond to port pairs {0,1}, {2,3}, {4,5} and {6,7}, so as to avoid interference between them.

In this implementation, the configuration information of each measure resource may include the number of antenna ports and the number of antenna ports needed by each beam. Hence, the UE may measure and report sequentially.

In this embodiment, the measurement and report of the UE end shall be described in the following embodiments.

With the method of this embodiment, at the base station end, the enhanced reference signals using different beamforming are transmitted, the UE end measures and reports the enhanced reference signals configured by the base station end, and the base station end coarsely selects beams according to the measurement result. Based upon this, the base station end may further configure that the UE end periodically and aperiodically reports the channel state information, and finally determine the 3D MIMO transmission method according to a reported result, thereby solving a problem that measurement of a beam-formed channel by a conventional reference signal is not accurate enough. By accurate beam selection, the system increases beam-formed gains, thereby reducing interference between different beams, and improving the performance of the system.

Embodiment 2

Figure 3:
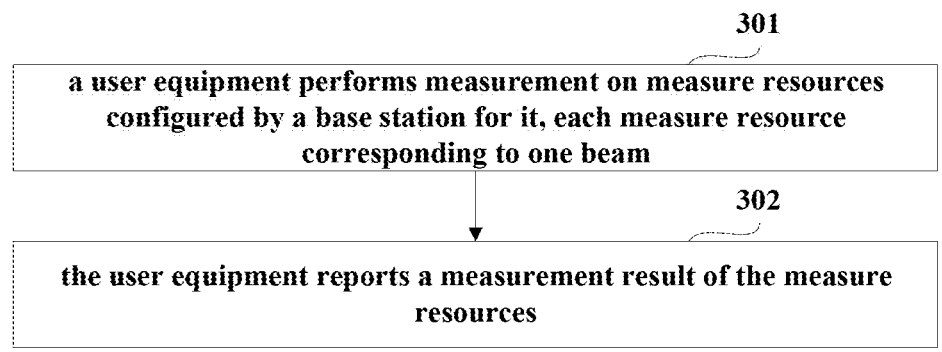
FIG. 3 is a flowchart of another implementation of the beam selection method of the embodiment of the present disclosure.

An embodiment of the present disclosure further provides a beam selection method, which is processing at a UE end corresponding to the method of Embodiment 1, with contents identical to those in Embodiment 1 being not going to be described any further. FIG. 3 is a flowchart of the method. Referring to FIG. 3, the method includes:

step 301: a user equipment performs measurement on measure resources configured by a base station for it, each measure resource corresponding to one beam; and step 302: the user equipment reports a measurement result of the measure resources.

In this embodiment, corresponding to the measure resources configured by the base station, the UE may perform corresponding measurement on the measure resources, and report a measurement result. As the measure resources have been described in detail in Embodiment 1, their contents are incorporated herein, and shall not be described any further.

In an implementation, contents measured by the UE end include reference signal receiving power (RSRP) and/or reference signal receiving quality (RSRQ). Taking beam-formed gain into account, the RSRP may reflect channel qualities of different beams, and the UE end may report serial numbers of enhanced reference signals (such as CSI-RSs) to which the beams correspond. And if the base station needs to acquire a difference between beam-formed gains of multiple beams, the UE end may further report RSRP and/or RSRQ to which the multiple beams correspond.

In an implementation, the base station further configures a CSI process according to a measurement result reported by the UE, at this moment, the UE periodically and aperiodically reports CSI corresponding to the CSI process, hence, the base station may further determine beams used for 3D MIMO transmission.

With the method of this embodiment, the UE measures the measure resources corresponding to the beams according to the configuration of the base station and reports the measurement result, so that the base station selects suitable beams for 3D MIMO transmission, thereby solving a problem that measurement of a beam-formed channel by a conventional reference signal is not accurate enough. By accurate beam selection, the system increases beam-formed gains, thereby reducing interference between different beams, and improving the performance of the system.

For the methods of Embodiment 1 and Embodiment 2 to be more clearly and easily understood, they shall be described below with reference to a flowchart of an interaction between a base station and LIE.

Figure 4:
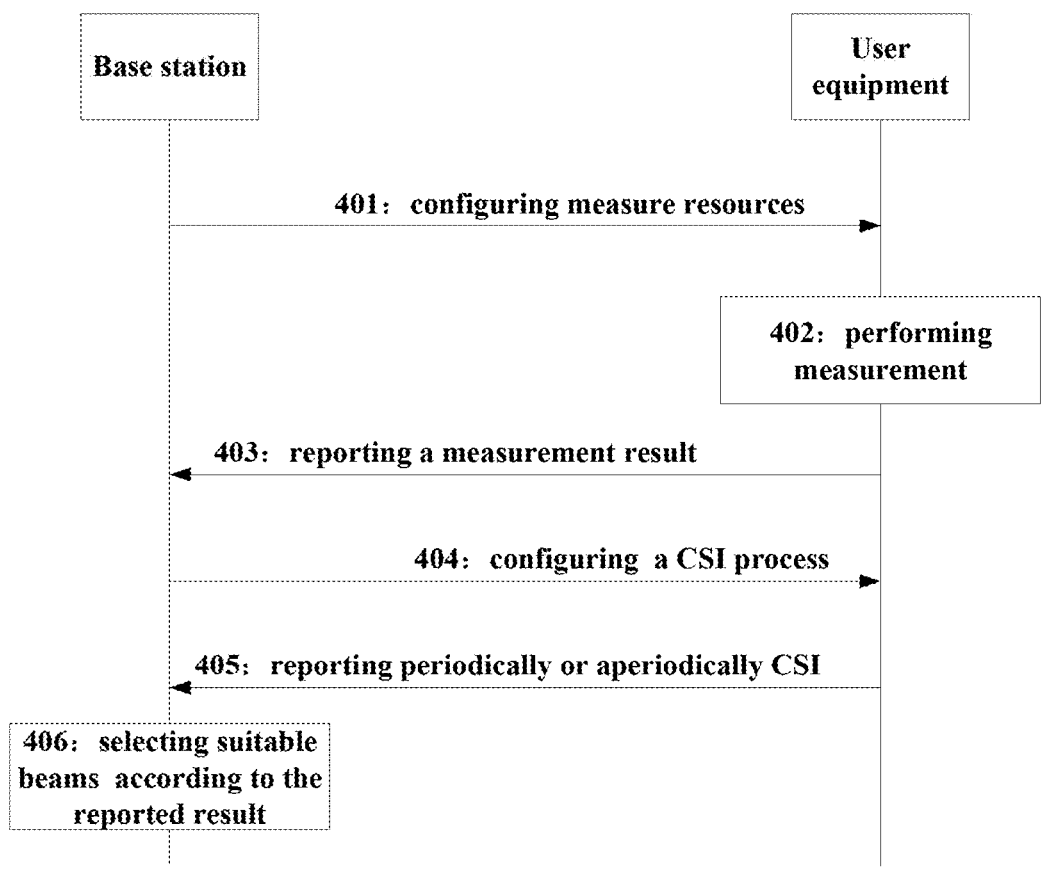
FIG. 4 is a flowchart of an interaction between a base station and UE of an embodiment of the present disclosure.

FIG. 4 is a flowchart of an interaction in which the base station and the UE perform beam selection according respectively to the methods of Embodiment 1 and Embodiment 2. Referring to FIG. 4, the method includes:

step 401: the base station configures measure resources for the UE;

wherein, as described above, each measure resource corresponds to one beam, and the measure resource may be an enhanced reference signal, and may also be an antenna port; and the base station may configure the measure resource via high-layer signaling, and may also configure the measure resource in a predefining manner;

step 402: the UE performs measurement on resources configured by the base station;

step 403: the UE reports a measurement result;

wherein, as described above, the measurement result may be serial numbers of measure resources corresponding to different beams, and may also be RSRP and/or RSRQ corresponding to different beams;

step 404: the base station configures further a CSI process;

wherein, the base station may not configure the CSI process, but directly select beams used for 3D MIMO transmission according the measurement result reported by the UE, and may further configure the CSI process;

step 405: the UE reports periodically or aperiodically CSI corresponding to the CSI process configured by the base station; and step 406: the base station selects suitable beams and a transmission scheme for 3D MIMO transmission according to the reported result of the UE.

In this embodiment, the method is not only applicable to beam selection, but also to cell selection, as long as the measure resources correspond to cells instead of the beams. For example, if measure resources of reference signals of each cell correspond to cells, such as being correlated to cell IDs (identifiers), the method of this embodiment may also be applicable to cell selection.

For example, for an FDD system, there exist twenty possible 2-port CSI-RS resources (or equivalent ten 4-port CSI-RS resources, or equivalent five 8-port CSI-RS resources) in one RB; first, modulo operation is performed on the cell ID by 10, the remainder corresponding to the CSI-RS resources; a method in which the measure resources of the beams of each cell correspond to the antenna ports is adopted, the UE performs the measurement on the ports of the resources to which the cells correspond, and the base station selects cells and corresponding beams according to a measurement result fed back by the UE.

For another example, the measure resources correspond to reference signals of five cells (each cell having four beams not well correlated to each other) (or ten cells (each cell having two beams not well correlated to each other, beams well correlated to each other may reuse these time-frequency resources in a manner of code division)), and other cells spatially reuse these reference signal resources. And the UE performs measurement on corresponding reference signals, and reports a corresponding measurement result.

With the method of this embodiment, measurement of the UE end is used to optimize beam selection, thereby improving accuracy of beam-forming at the base station end, and optimizing the performance of the system.

An embodiment of the present disclosure further provides a beam selection apparatus, as described in Embodiment 3 below. As principles of the apparatus are similar to that of the method of Embodiment 1, the implementation of the method of Embodiment 1 may be referred to for the implementation of the apparatus, with identical contents being not going to be described herein any further.

Embodiment 3

Figure 5:
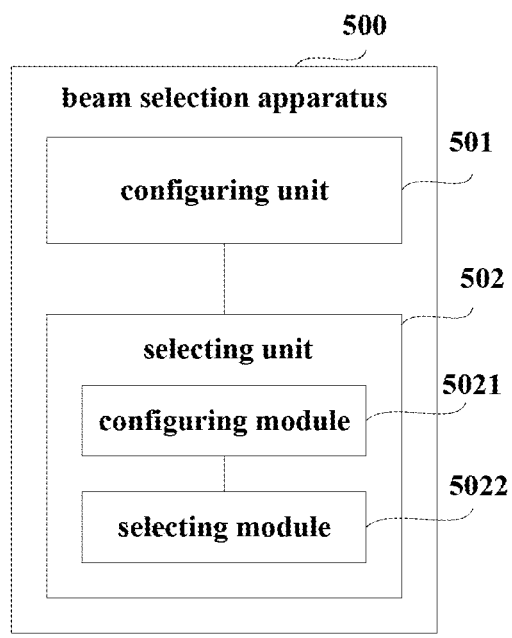
FIG. 5 is a flowchart of an implementation of the beam selection apparatus of an embodiment of the present disclosure.

An embodiment of the present disclosure provides a beam selection apparatus, the apparatus may be applicable to a base station. FIG. 5 is a schematic diagram of a structure of the apparatus. As shown in FIG. 5, the apparatus 500 includes:

a configuring unit 501 configured to configure user equipment (UE) with measure resources, each measure resource corresponding to one beam; and a selecting unit 502 configured to, according to a measurement result reported by the UE, select a beam used for performing 3-dimensional multiple input multiple output (3D MIMO) transmission.

In an implementation of this embodiment, the selecting unit 502 includes:

a configuring module 5021 configured to configure a channel state information (CSI) process according to the measurement result reported by the UE; and a selecting module 5022 configured to select the beam used for performing 3D MIMO transmission according to a result reported by the UE.

In an implementation of this embodiment, the measure resources are enhanced reference signals. In this implementation, the enhanced reference signals may be channel state information reference signals (CSI-RSs), and may also be reduced cell-specific reference signals (CRSs). In this implementation, configuration information of each of the measure resources may include: the number of antenna ports; information on resource location in one resource block; and information on subframe configuration. Furthermore, it may further include: frequency resource information, and/or power-related information.

In another implementation of this embodiment, the measure resources are antenna ports. In this implementation, configuration information of each of the measure resources may include: the number of antenna ports; and the number of antenna ports needed by each beam.

By configuring the UE with the measure resources corresponding to the beams by the beam selection apparatus of this embodiment, and selecting suitable beams for 3D MIMO transmission according to the measurement result of the UE, a problem that measurement of a beam-formed channel by a conventional reference signal is not accurate enough is solved. By accurate beam selection, the system increases beam-formed gains, thereby reducing interference between different beams, and improving the performance of the system.

Embodiment 4

An embodiment of the present disclosure further provides a base station, including the beam selection apparatus as described in Embodiment 3.

Figure 6:
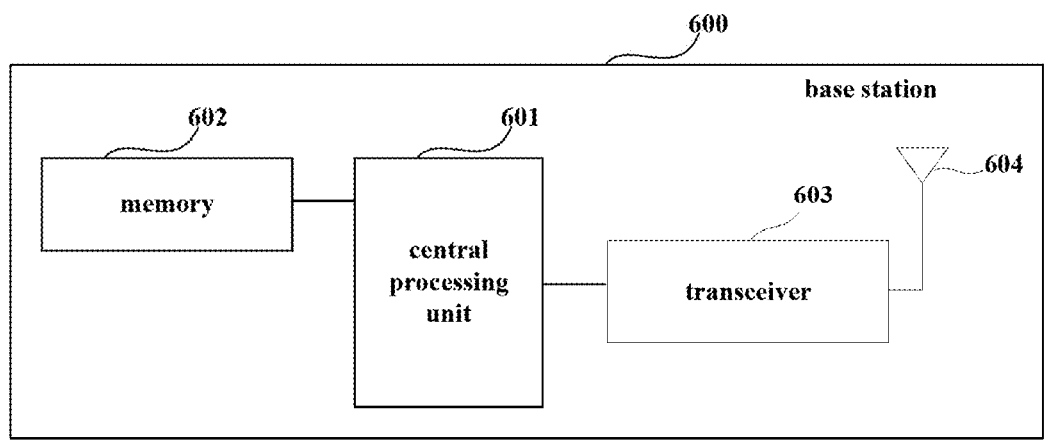
FIG. 6 is a flowchart of an implementation of the base station of an embodiment of the present disclosure.

FIG. 6 is a schematic diagram of a structure of the base station of the embodiment of the present disclosure. As shown in FIG. 6, the base station 600 may include a central processing unit (CPU) 601 and a memory 602, the memory 602 being coupled to the central processing unit 601. In this embodiment, the memory 602 may store various data, and may further store programs for information processing, and the programs are executed under control of the central processing unit 601, so as to receive various information transmitted by the UE, and transmit request information to the UE.

In an implementation, the function of the beam selection apparatus may be integrated into the central processing unit 601. In this implementation, the central processing unit 601 may be configured to: configure user equipment (UE) with measure resources, each measure resource corresponding to one beam; and select a beam used for performing 3-dimensional multiple input multiple output (3D MIMO) transmission according to a measurement result reported by the UE.

Alternatively, the central processing unit 601 may further be configured to: configure a channel state information (CSI) process according to the measurement result reported by the UE; and select the beam used for performing 3D MIMO transmission according to a result reported by the UE.

Alternatively, the measure resources are enhanced reference signals. The enhanced reference signals may be channel state information reference signals (CSI-RSs), or reduced cell-specific reference signals (CRSs). In this embodiment, configuration information of each of the measure resources includes: the number of antenna ports; information on resource location in one resource block; and information on subframe configuration. Or, furthermore, configuration information of each of the measure resources further includes: frequency resource information, and/or power-related information.

Alternatively, the measure resources are antenna ports. In this embodiment, configuration information of each of the measure resources includes: the number of antenna ports; and the number of antenna ports needed by each beam.

In another implementation, the beam selection apparatus and the central processing unit 601 may be configured separately. For example, the beam selection apparatus may be configured as a chip connected to the central processing unit 601, with its functions being realized under control of the central processing unit 601.

Furthermore, as shown in FIG. 6, the base station 600 may further include a transceiver 603 and an antenna 604, etc.; wherein, functions of these components are similar to those in the prior art, and shall not be described herein any further. It should be noted that the base station 600 does not necessarily include all the parts shown in FIG. 6. Furthermore, the base station 600 may further include parts not shown in FIG. 6, and the prior art may be referred to.

By configuring the UE with the measure resources corresponding to the beams by the base station of this embodiment, and selecting suitable beams for 3D MIMO transmission according to the measurement result of the UE, a problem that measurement of a beam-formed channel by a conventional reference signal is not accurate enough is solved. By accurate beam selection, the system increases beam-formed gains, thereby reducing interference between different beams, and improving the performance of the system.

An embodiment of the present disclosure further provides a beam selection apparatus, as described in Embodiment 5 below. As principles of the apparatus are similar to that of the method of Embodiment 2, the implementation of the method of Embodiment 2 may be referred to for the implementation of the apparatus, with identical contents being not going to be described herein any further.

Embodiment 5

Figure 7:
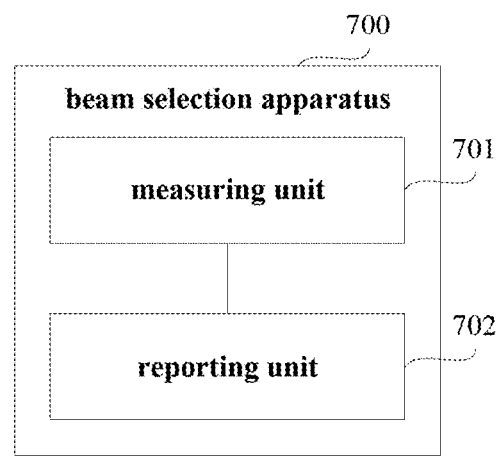
FIG. 7 is a flowchart of another implementation of the beam selection apparatus of the embodiment of the present disclosure.

An embodiment of the present disclosure provides a beam selection apparatus, the apparatus may be applicable to UE. FIG. 7 is a schematic diagram of a structure of the apparatus. As shown in FIG. 7, the apparatus 700 includes:

a measuring unit 701 configured to perform measurement on measure resources configured by a base station, each measure resource corresponding to one beam; and a reporting unit 702 configured to report a measurement result of the measure resources.

In this embodiment, the reporting unit 702 is further configured to periodically and aperiodically report CSI corresponding to a CSI process configured by the base station, so that the base station selects a beam used for performing 3D MIMO transmission accordingly.

In this embodiment, as the measure resources have been described in detail in Embodiment 1, their contents are incorporated herein, and shall not be described any further.

In this embodiment, the measurement result reported by the reporting unit 702 may be a serial number to which a measure resource corresponds, and may also be RSRP and/or RSRQ, and this embodiment is not limited thereto. In particular implementation, a corresponding measurement result may be reported as required by the base station.

By measuring by the beam selection apparatus of this embodiment according to the measure resources corresponding to the beams configured by the base station, the base station may be assisted in selecting suitable beams for 3D MIMO transmission according to the measurement result, a problem that measurement of a beam-formed channel by a conventional reference signal is not accurate enough is solved. By accurate beam selection, the system increases beam-formed gains, thereby reducing interference between different beams, and improving the performance of the system.

Embodiment 6

An embodiment of the present disclosure further provides UE, including the beam selection apparatus as described in Embodiment 5.

Figure 8:
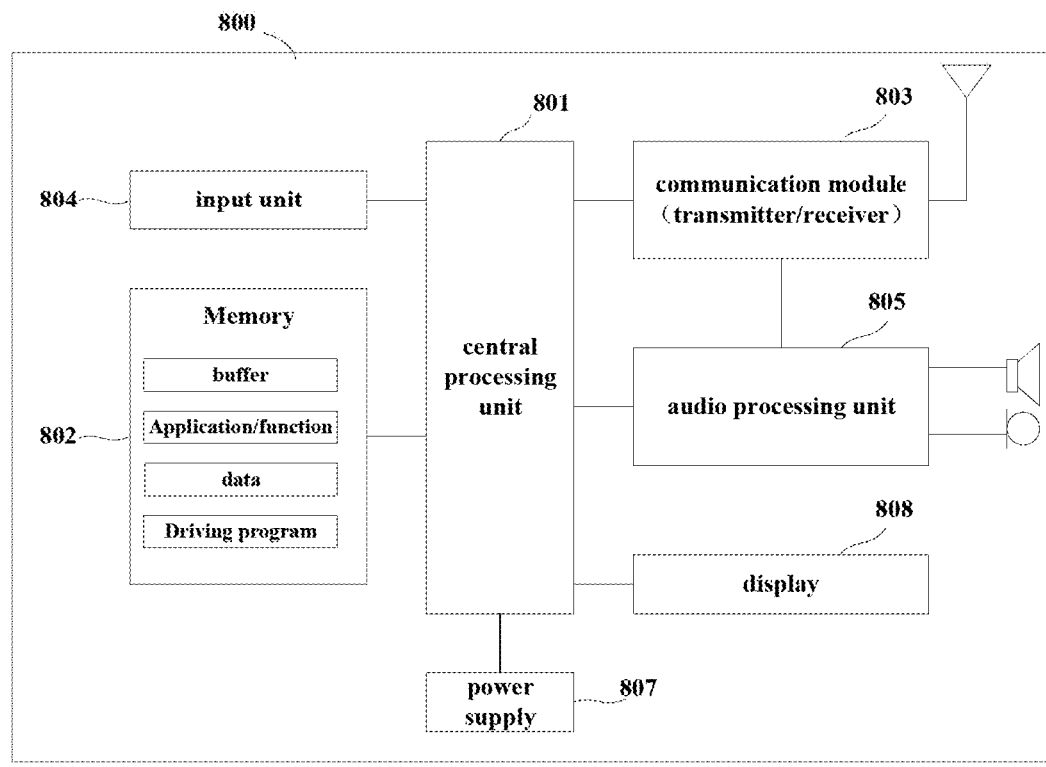
FIG. 8 is a flowchart of an implementation of the user equipment of an embodiment of the present disclosure.

FIG. 8 is a schematic diagram of a structure of the UE of the embodiment of the present disclosure. As shown in FIG. 8, the UE 800 may include a central processing unit 801 and a memory 802, the memory 802 being coupled to the central processing unit 801. It should be noted that this figure is illustrative only, and other types of structures may also be used, so as to supplement or replace this structure and achieve telecommunications function or other functions.

In an implementation, the function of the beam selection apparatus may be integrated into the central processing unit 801. In this implementation, the central processing unit 801 may be configured to: perform measurement on measure resources configured by a base station, each measure resource corresponding to one beam; and report a measurement result of the measure resources.

Alternatively, the central processing unit 801 may further be configured to periodically and aperiodically report CSI corresponding to a CSI process configured by the base station, so that the base station selects a beam used for performing 3D MIMO transmission accordingly.

In another implementation, the beam selection apparatus and the central processing unit 801 may be configured separately. For example, the beam selection apparatus may be configured as a chip connected to the central processing unit 801, with its functions being realized under control of the central processing unit 801.

As shown in FIG. 8, the UE 800 may further include a communication module 803, an input unit 804, an audio processing unit 805, a display 808, and a power supply 807. It should be noted that the UE 800 does not necessarily include all the parts shown in FIG. 8. Furthermore, the UE 800 may further include other parts than those shown in FIG. 8, and the prior art may be referred to.

As shown in FIG. 8, the central processing unit 801 is sometimes referred to as a controller or control, and may include a microprocessor or other processor devices and/or logic devices. The central processing unit 801 receives input and controls operations of every component of the UE 800.

In this embodiment, the memory 802 may be, for example, one or more of a buffer memory, a flash memory, a hard drive, a mobile medium, a volatile memory, a nonvolatile memory, or other suitable devices. The memory 802 may store the above information, and may further store programs executing related information. And the central processing unit 801 may execute the programs stored in the memory 802, so as to realize information storage or processing, etc. Functions of other parts are similar to those of the prior art, which shall not be described herein any further. The parts of the UE 800 may be realized by specific hardware, firmware, software, or any combination thereof, without departing from the scope of the present disclosure.

By measuring by the UE of this embodiment according to the measure resources corresponding to the beams configured by the base station, the base station may be assisted in selecting suitable beams for 3D MIMO transmission according to the measurement result, a problem that measurement of a beam-formed channel by a conventional reference signal is not accurate enough is solved. By accurate beam selection, the system increases beam-formed gains, thereby reducing interference between different beams, and improving the performance of the system.

Embodiment 7

An embodiment of the present disclosure further provides a communication system, including the base station as described in Embodiment 4 and the UE as described in Embodiment 6.

Figure 9:
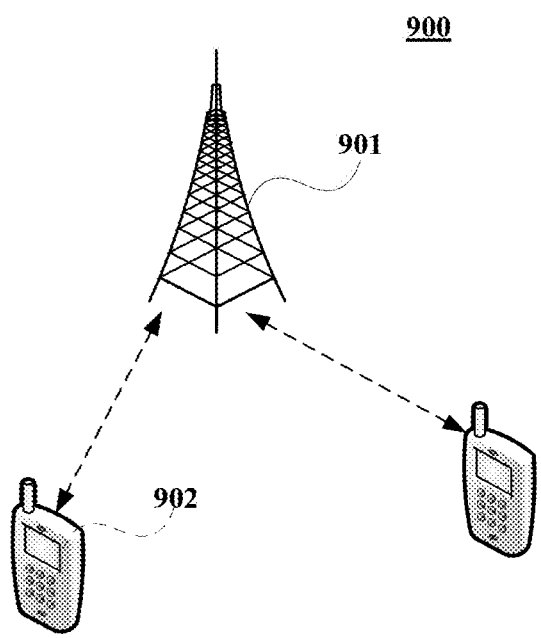
FIG. 9 is a schematic diagram of a structure the communication system of an embodiment of the present disclosure.

FIG. 9 is a schematic diagram of a structure the communication system of the embodiment of the present disclosure. As shown in FIG. 9, the communication system 900 includes a base station 901 and UE 902. In this embodiment, the base station 901 may be the base station 600 as described in Embodiment 4, and the UE 902 may be the UE 800 as described in Embodiment 6.

In this embodiment, the base station 901 is configured to configure the user equipment (UE) with measure resources, and select a beam used for performing 3-dimensional multiple input multiple output (3D MIMO) transmission according to a measurement result reported by the UE. As contents of the base station 901 have been described in detail in Embodiment 4, the contents are incorporated herein, and shall not be described any further.

In this embodiment, the UE 902 is configured to perform measurement on measure resources configured by the base station, each measure resource corresponding to one beam, and report a measurement result of the measure resources. As contents of the UE 902 have been described in detail in Embodiment 6, the contents are incorporated herein, and shall not be described any further.

In this embodiment, each measure resource corresponds to one beam.

With the communication system of this embodiment, the base station configures the UE with the measure resources corresponding to the beams, and selects suitable beams for performing 3D MIMO transmission according to a measurement result reported by the UE, thereby solving a problem that measurement of a beam-formed channel by a conventional reference signal is not accurate enough. By accurate beam selection, the system increases beam-formed gains, thereby reducing interference between different beams, and improving the performance of the system.

An embodiment of the present disclosure further provides a computer-readable program, wherein when the program is executed in a base station, the program enables the base station to carry out the beam selection method as described in Embodiment 1.

An embodiment of the present disclosure provides a storage medium in which a computer-readable program is stored, wherein the computer-readable program enables a base station to carry out the beam selection method as described in Embodiment 1.

An embodiment of the present disclosure further provides a computer-readable program, wherein when the program is executed in UE, the program enables the UE to carry out the beam selection method as described in Embodiment 2.

An embodiment of the present disclosure provides a storage medium in which a computer-readable program is stored, wherein the computer-readable program enables UE to carry out the beam selection method as described in Embodiment 2.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principles of the present disclosure, and such variants and modifications fall within the scope of the present disclosure.

What is claimed is:

1. A beam selection apparatus, comprising:
   a memory that stores a plurality of instructions; and
   a processor coupled to the memory and configured to execute the instructions to:
   configure a user equipment (UE) with measure resources, each measure resource corresponding to one beam; and
   select a beam used for performing 3-dimensional multiple input multiple output transmission according to a measurement result reported by the UE, wherein the measure resources corresponding to different beams are differentiated in a pseudo code, the pseudo code is differentiated in an initial value of the pseudo code calculated with beam indices, each of the beam indices identifying each of the different beams.

2. The beam selection apparatus according to claim 1, wherein the processor is configured to execute the instructions to:
   configure a channel state information (CSI) process according to the measurement result reported by the UE; and
   select the beam used for performing 3-dimensional multiple input multiple output transmission according to a result reported by the UE.

3. The beam selection apparatus according to claim 1, wherein the measure resources are enhanced reference signals.

4. The beam selection apparatus according to claim 3, wherein the enhanced reference signals are channel state information reference signals (CSI-RSs) or reduced cell-specific reference signals (CRSs).

5. The beam selection apparatus according to claim 3, wherein configuration information of each of the measure resources comprises:
   the number of antenna ports;
   information on resource location in one resource block; and
   information on subframe configuration.

6. The beam selection apparatus according to claim 5, wherein configuration information of each of the measure resources further comprises:
   frequency resource information, and/or
   power-related information.

7. The beam selection apparatus according to claim 1, wherein the measure resources are antenna ports.

8. The beam selection apparatus according to claim 7, wherein configuration information of each of the measure resources comprises:
   the number of antenna ports; and
   the number of antenna ports needed by each beam.

9. The beam selection apparatus according to claim 1, wherein neighboring beams do not correspond to port pairs (0,1), (2,3), (4,5) and (6,7).

10. The beam selection apparatus according to claim 1, wherein measure resources corresponding to different beams are differentiated in a manner of time division, code division, or frequency division.

11. A beam selection apparatus, comprising:
    a memory that stores a plurality of instructions; and
    a processor coupled to the memory and configured to execute the instructions to:
    perform measurement on measure resources configured by a base station, each measure resource corresponding to one beam; and report a measurement result of the measure resources, wherein the measure resources corresponding to different beams are differentiated in a pseudo code, the pseudo code is differentiated in an initial value of the pseudo code calculated with beam indices, each of the beam indices identifying each of the different beams.

12. The beam selection apparatus according to claim 11, wherein,
the processor is further configured to execute the instructions to periodically and aperiodically report CSI corresponding to a CSI process configured by the base station, so that the base station selects a beam used for performing 3-dimensional multiple input multiple output transmission accordingly.

13. The beam selection apparatus according to claim 11, wherein the processor is further configured to execute the instructions to report reference signal receiving power and/or reference signal receiving quality to which multiple beams correspond.

14. A communication system, comprising a base station and a user equipment (UE); wherein,
the base station is configured to configure the UE with measure resources, and select a beam used for performing 3-dimensional multiple input multiple output transmission according to a measurement result reported by the UE;

and the UE is configured to perform measurement on measure resources configured by the base station, and report a measurement result of the measure resources;

and wherein, each measure resource corresponds to one beam, wherein the measure resources corresponding to different beams are differentiated in a pseudo code, the pseudo code is differentiated in an initial value of the pseudo code calculated with beam indices, each of the beam indices identifying each of the different beams.

* * * * *